US012582092B2

(12) United States Patent　　(10) Patent No.:　US 12,582,092 B2
Olivas et al.　　(45) Date of Patent:　Mar. 24, 2026

(54) AUTOMATED PET FOOD BOWL

(71) Applicants:Lorenzo Olivas, El Paso, TX (US);
Martin Gomez, El Paso, TX (US)

(72) Inventors: Lorenzo Olivas, El Paso, TX (US);
Martin Gomez, El Paso, TX (US)

( * ) Notice: Subject to any disclaimer, the term of this
patent is extended or adjusted under 35
U.S.C. 154(b) by 124 days.

(21) Appl. No.: 18/439,455

(22) Filed: Feb. 12, 2024

(65) Prior Publication Data

US 2025/0255271 A1　　Aug. 14, 2025

(51) Int. Cl.
A01K 5/02　　(2006.01)

(52) U.S. Cl.
CPC ................................. A01K 5/0291 (2013.01)

(58) Field of Classification Search
CPC .............................. A01K 5/025; A01K 5/0291
See application file for complete search history.

(56) References Cited

U.S. PATENT DOCUMENTS

| | | | | |
|---|---|---|---|---|
| 2,709,988 A | * | 6/1955 | Hatcher | .................... A01K 5/01 |
| | | | | 119/62 |
| 3,763,826 A | | 10/1973 | Portelli | |
| 5,433,171 A | | 7/1995 | Ewell | |
| 5,483,923 A | | 1/1996 | Sabbara | |
| 5,669,328 A | * | 9/1997 | Lanfranchi | .............. A01K 5/02 |
| | | | | 119/57.92 |
| 5,794,560 A | | 8/1998 | Terenzi | |

| | | | | |
|---|---|---|---|---|
| 6,135,056 A | | 10/2000 | Kuo | |
| 6,349,671 B1 | * | 2/2002 | Lewis | .................... A01K 5/025 |
| | | | | 119/51.02 |
| 7,124,707 B1 | * | 10/2006 | Clarke | ................. A01K 5/0291 |
| | | | | 119/61.5 |
| 2004/0200426 A1 | * | 10/2004 | Drummond | .......... A01K 5/0114 |
| | | | | 119/166 |
| 2008/0029034 A1 | * | 2/2008 | Busbice | ................. A01K 5/025 |
| | | | | 119/51.11 |
| 2015/0040832 A1 | * | 2/2015 | Klein | .................... A01K 5/025 |
| | | | | 119/51.11 |
| 2016/0157461 A1 | * | 6/2016 | Hill | ....................... A01K 5/0114 |
| | | | | 119/51.01 |
| 2016/0212971 A1 | * | 7/2016 | Hill | ....................... A01K 5/0114 |
| 2017/0042116 A1 | * | 2/2017 | Lindskov | .............. A01K 5/025 |
| 2021/0176956 A1 | * | 6/2021 | Huang | ................... A01K 5/025 |
| 2024/0081283 A1 | * | 3/2024 | Franklin | .............. A01K 5/0208 |
| 2024/0172720 A1 | * | 5/2024 | Burke | ................... A01K 5/025 |

FOREIGN PATENT DOCUMENTS

| | | | | | |
|---|---|---|---|---|---|
| CN | 102960260 | | 3/2013 | | |
| GB | 2595585 A | * | 12/2021 | .......... | A01K 5/0114 |
| WO | WO-2011110822 A2 | * | 9/2011 | .......... | A01K 5/0291 |

* cited by examiner

*Primary Examiner* — Michael H Wang

(57)　　ABSTRACT

An automated dog bowl device generally includes a food
container portion, a lid portion, a drive arrangement, and a
controller device. The drive arrangement is mounted on the
food container portion and designed to pivot the lid portion
horizontally back and forth between a closed position and an
open position. The controller device permits operation both
on demand and on a timed schedule to cover and uncover the
food container portion on demand and automatically at
scheduled times selected by a user.

15 Claims, 8 Drawing Sheets

AUTOMATED PET FOOD BOWL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dog food bowls and more particularly pertains to a new automated dog bowl device for feeding dogs on a timed schedule. For dog owners, it is well known that dogs prefer scheduled feeding times, but sometimes owners are not present or forget the schedule. It is also beneficial to dogs to control how much they eat. It is further beneficial to protect the dog food from outside contamination or consumption by other pets or wild animals or pests, especially if the dog is elderly and/or the food is to be left outdoors or exposed for an extended period of time.

(2) Description of Related Art Including Information Disclosed Under 37 CFR 1.97 and 1.98

The prior art relates to dog food bowls and automated food dispensers. The prior art, as best understood, does not disclose an automated dog food bowl that runs on a timed schedule and has a lid that moves horizontally back and forth by a drive device to cover and uncover food in the dog food bowl.

BRIEF SUMMARY OF THE INVENTION

An embodiment of the disclosure meets the needs presented above in an automated dog bowl device generally comprising a food container portion, a lid portion, a drive arrangement, and a controller device. The food container portion is designed to contain dog food and be positioned in a stationary manner on a floor or ground surface. The lid portion is designed to cover the food container portion. The drive arrangement is mounted on the food container portion and designed and positioned to operatively connect the food container and the lid portion. The drive arrangement is designed to pivot the lid portion horizontally back and forth between a closed position in which the lid portion completely covers the food container portion and an open position in which the bowl portion is completely uncovered. The controller device is operatively connected to the drive arrangement to control the operation thereof both on demand and on a timed schedule to cover and uncover the food container portion on demand and automatically at scheduled times selected by a user.

To use the automated dog bowl device, a user manually inputs a command into the controller device and moves the lid portion from the closed position to the open position. The user then places dog food in the food container portion. The user manually inputs a timed schedule into the controller device of what times the food container portion should be uncovered and covered. The user manually inputs a command into the controller device and moves the lid portion from the open position to the closed position. The controller device automatically sends a signal to the drive arrangement to automatically move the lid portion horizontally from the closed position to the open position at a time in accordance with the timed schedule to permit a pet dog to access the interior of the food container portion and the dog food therein. The controller device automatically sends a signal from the controller device to the drive arrangement to automatically move the lid portion horizontally from the open position to the closed position at a time in accordance with the timed schedule to prevent overeating by the pet dog, unwanted access to the dog food by other pets or animals, and contamination or spoiling of the dog food.

In accordance with at least one possible embodiment, the automated dog bowl device offers several advantages. When a pet owner will be away for an extended time, the pet owner could put an amount of food in the food container portion equivalent to more than one feeding. The timer could be set such that the food is uncovered for a limited amount of time so the dog would have enough time for a sufficient feeding, but not so much time that the dog could overeat. In addition, the automatic covering effect will protect the dog food from contamination or consumption by other animals. Further, horizontal movement and curved surfaces of the automated dog bowl device would protect an animal from being harmed by the lid portion when the lid portion is moved into position for covering, as opposed to a lid that opens up and down that could slam on and/or trap the dog's head or that has sharp corners that could poke or cut a dog. The drive arrangement of course could be designed to run slowly and include limit or stop switches for safety such that the dog will be encouraged to remove its head but will not be trapped between the lid portion and the food container portion. Further, both the lid portion and the food container portion can have similar body designs to make manufacture simple and promote an effective seal when the automated dog bowl device is closed.

It should be understood that although the specification describes the invention in terms of food for dogs, the invention is applicable to all domesticated animals that may be fed from a bowl, such as dogs, cats, pigs, rabbits, horses and similar animals, though in a preferred embodiment the device is primarily for household pets such as dogs and cats.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
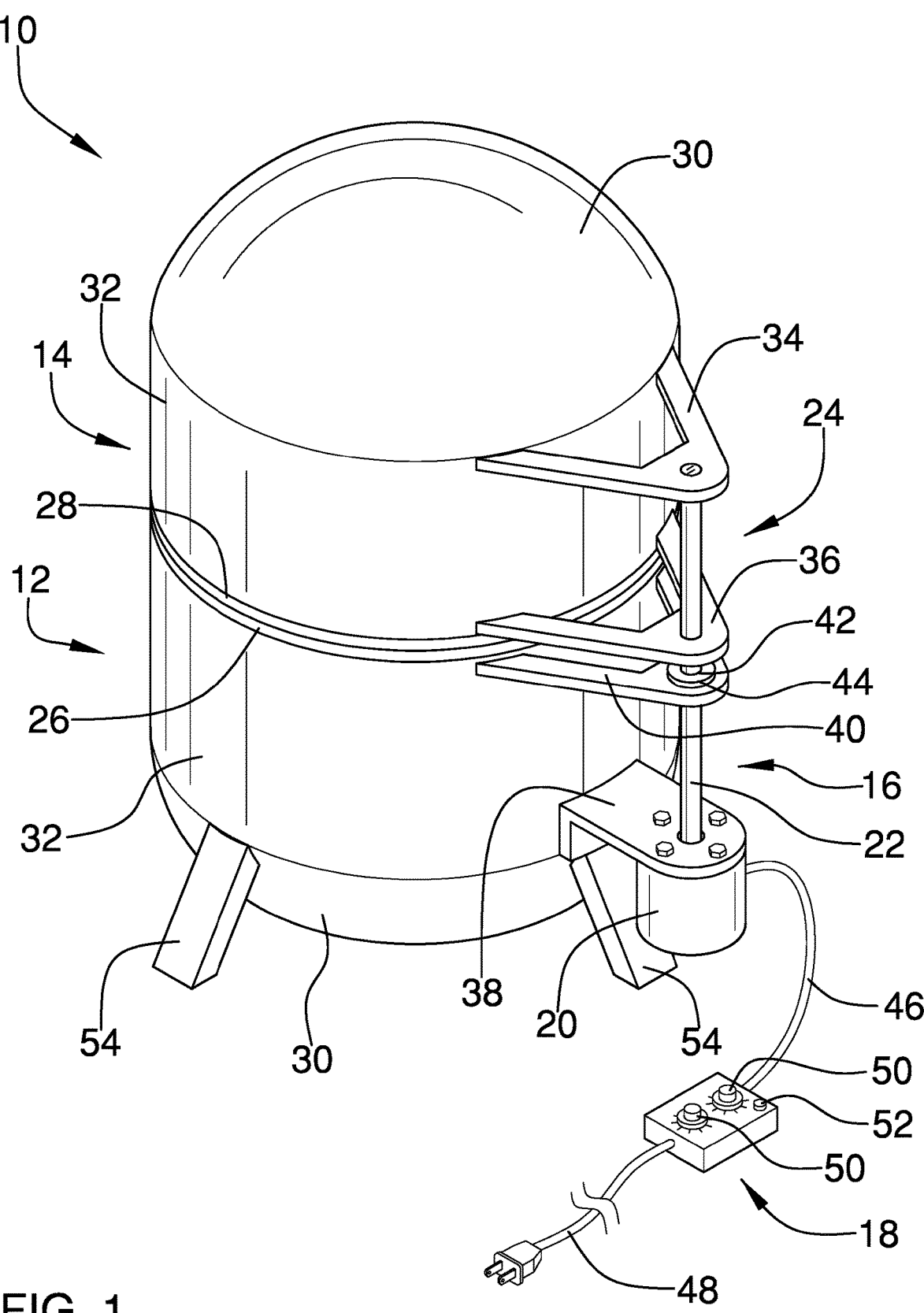
FIG. 1 is a rear perspective view of a automated dog bowl device according to an embodiment of the disclosure.
Figure 2:
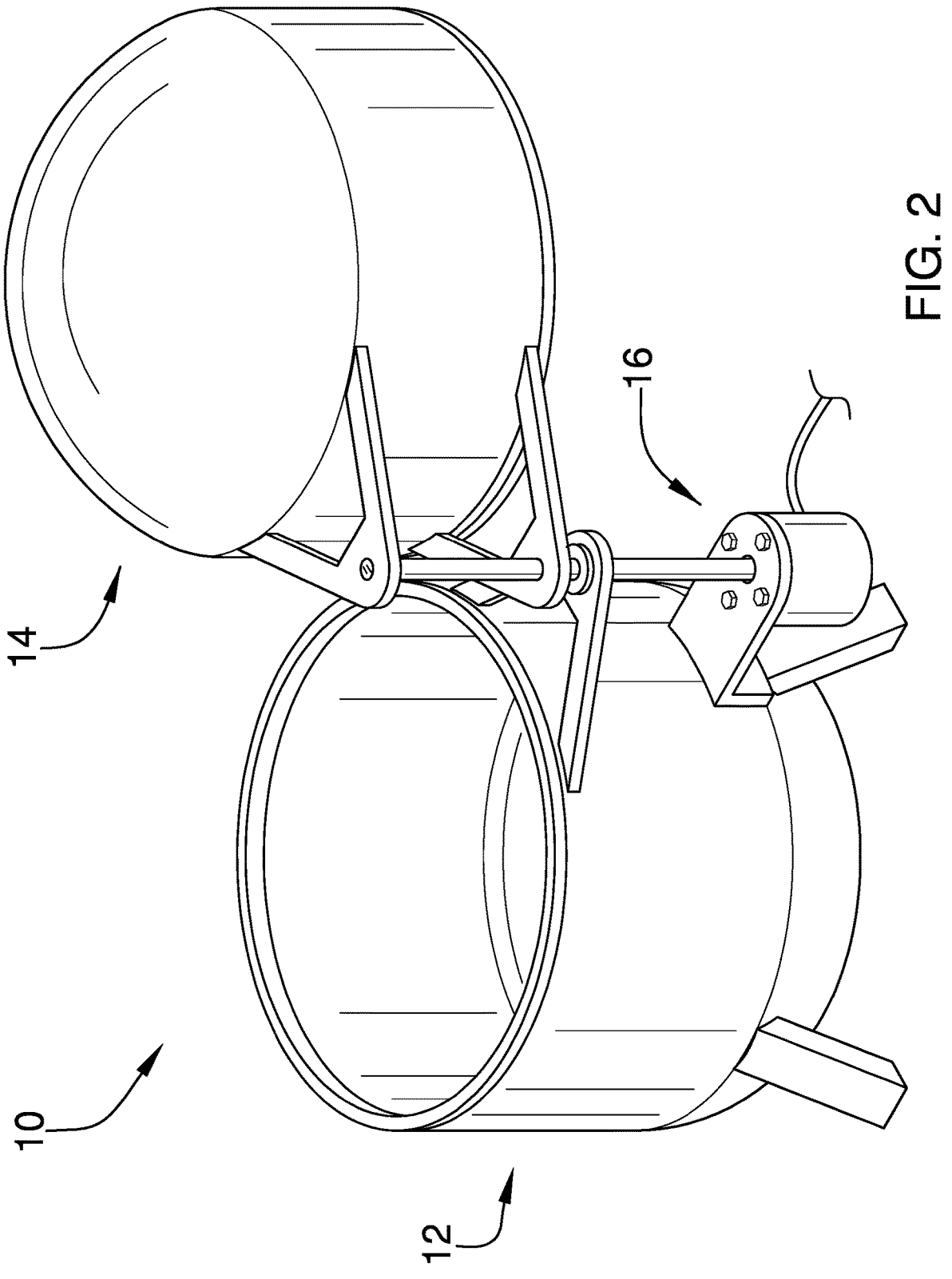
FIG. 2 is a rear perspective view of an embodiment of the disclosure.
Figure 3:
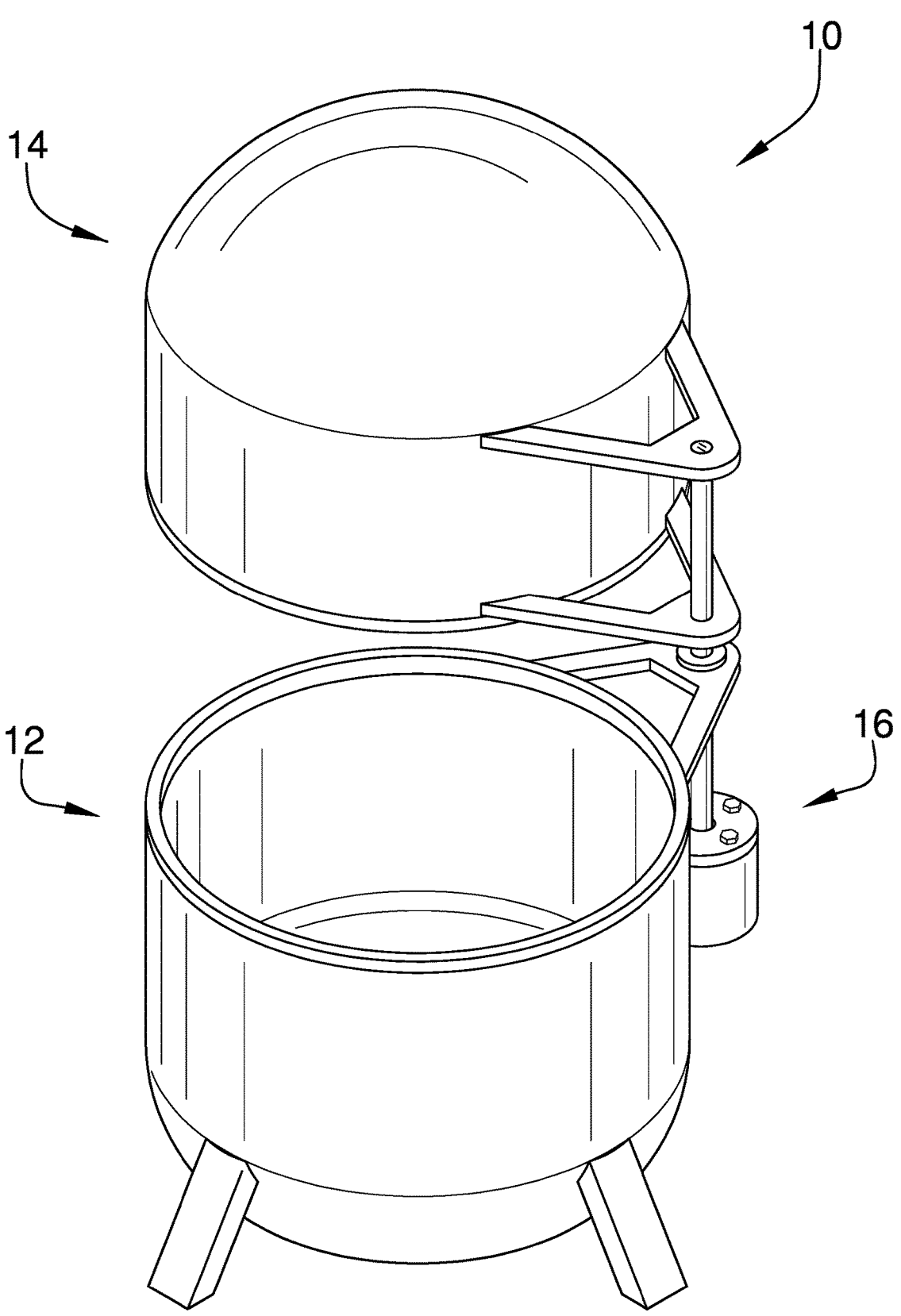
FIG. 3 is a front perspective view of an embodiment of the disclosure.
Figure 4:
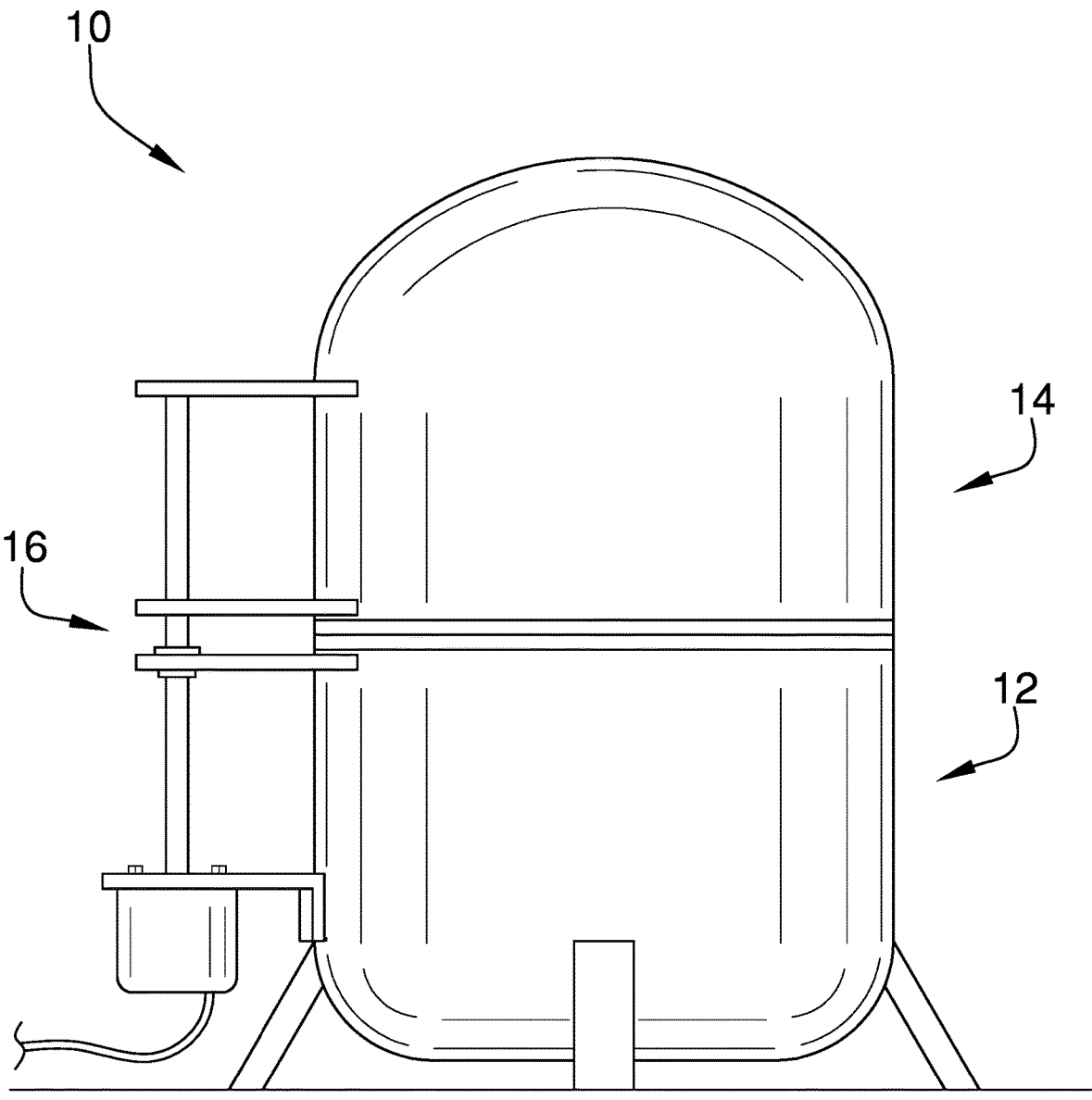
FIG. 4 is a side view of an embodiment of the disclosure.
Figure 5:
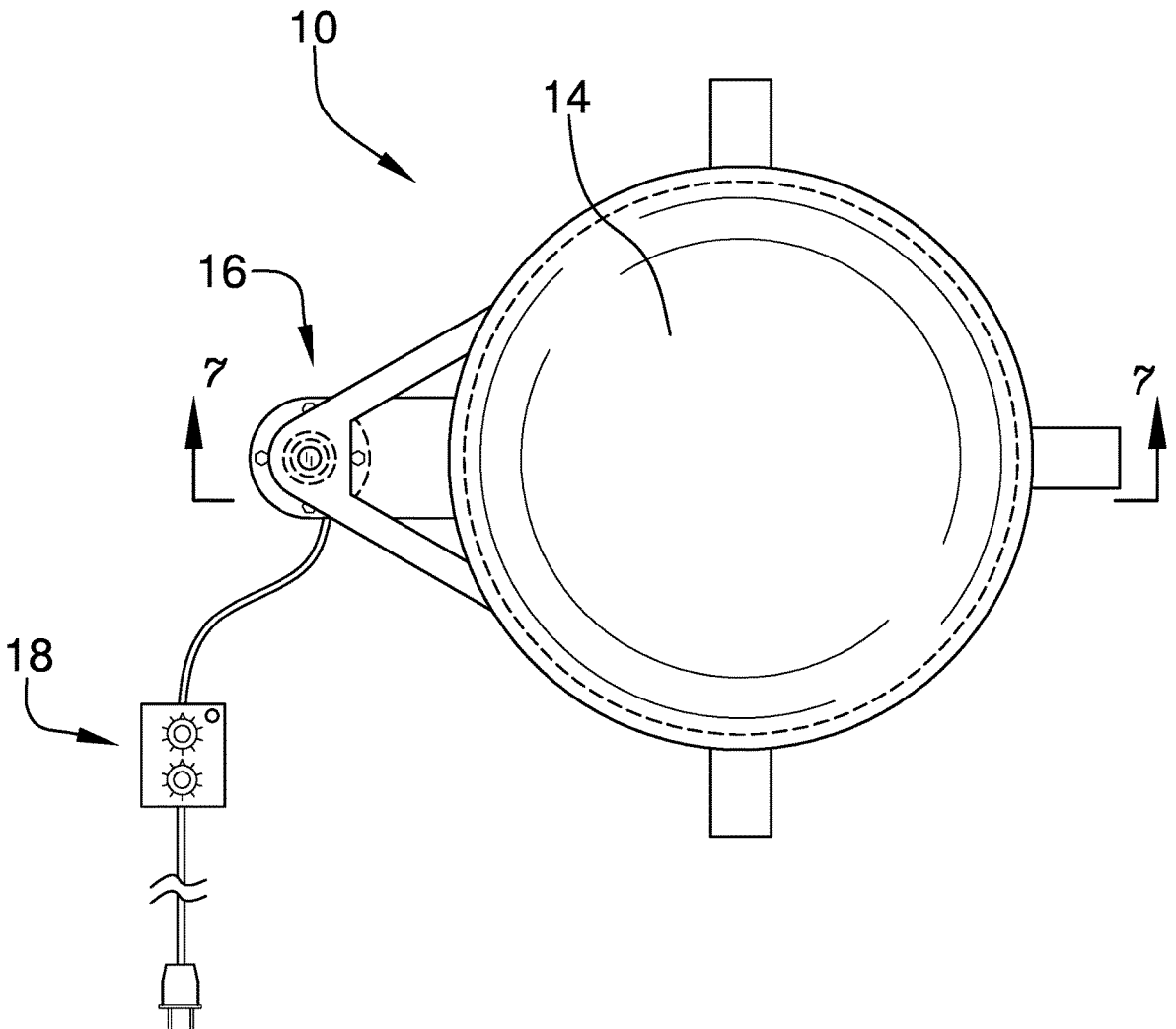
FIG. 5 is a top view of an embodiment of the disclosure.

With reference now to the drawings, and in particular to FIGS. 1 through 8 thereof, a new automated dog bowl device embodying the principles and concepts of an embodiment of the disclosure and generally designated by the reference numeral 10 will be described.

Figure 6:
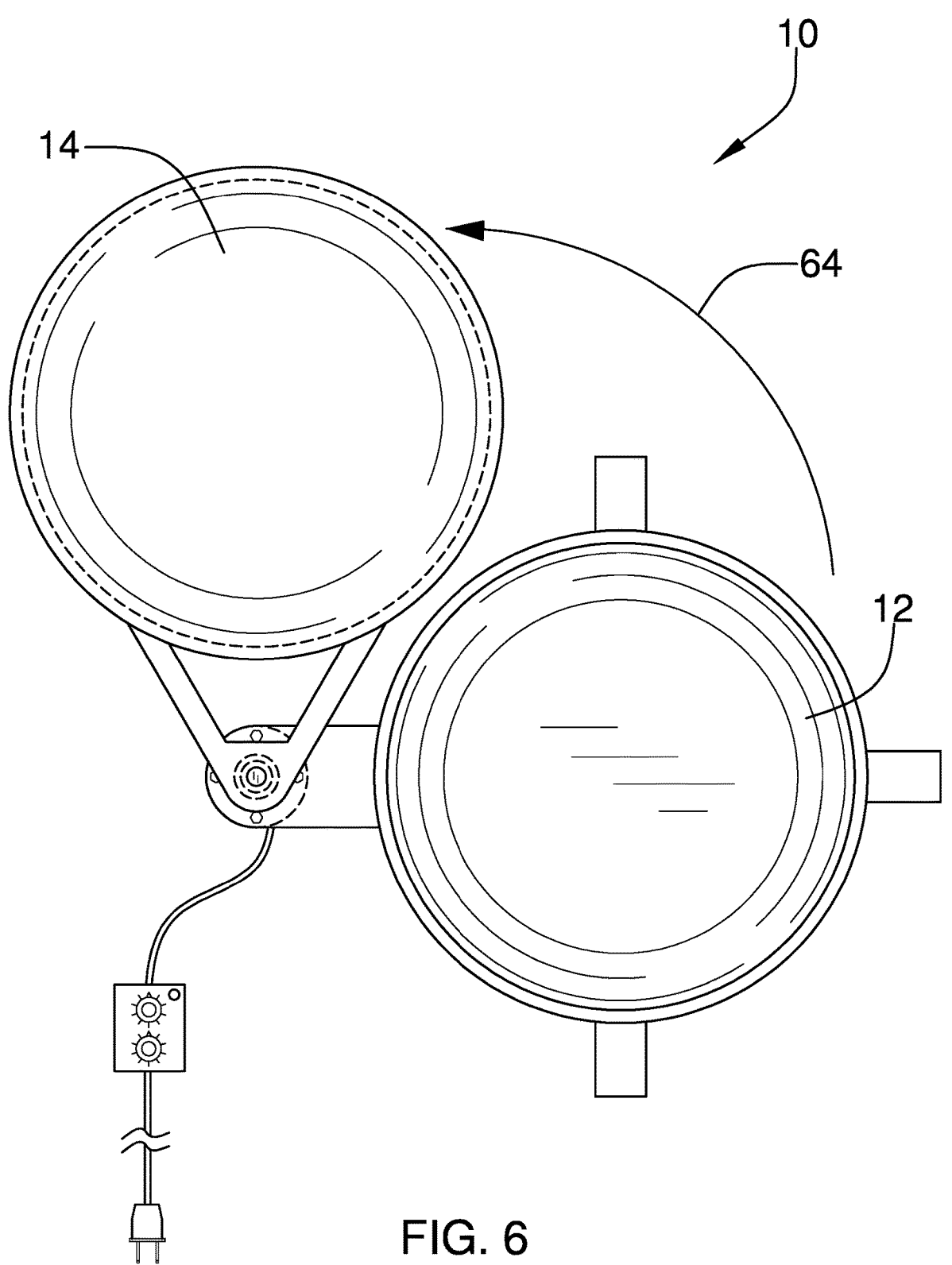
FIG. 6 is a top view of an embodiment of the disclosure.
Figure 7:
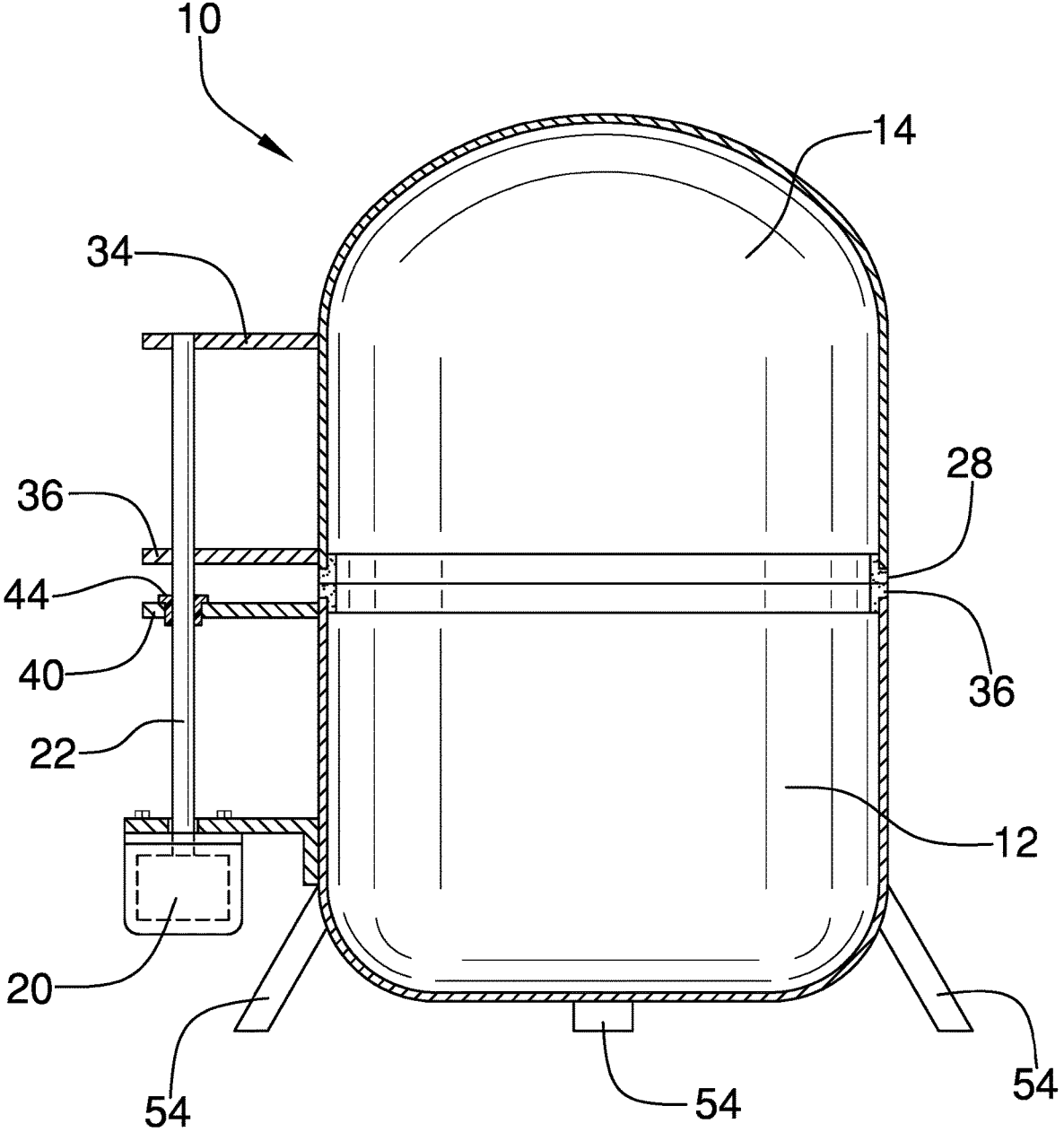
FIG. 7 is a side cross-sectional view of an embodiment of the disclosure.

As best illustrated in FIGS. 1 through 8, the automated dog bowl device 10 generally comprises a food container portion 12, a lid portion 14, a drive arrangement 16, and a controller device 18. The food container portion 12 is designed to contain dog food 60 and be positioned in a stationary manner on a floor or ground surface. The lid portion 14 is designed to cover the food container portion 12. The drive arrangement 16 is mounted on the food container portion 12 and designed and positioned to operatively connect the food container portion 12 and the lid portion 14. The drive arrangement 16 is designed to pivot the lid portion 14 horizontally back and forth between a closed position in which the lid portion 14 completely covers the food container portion 12 and an open position in which the bowl portion is completely uncovered. The controller device 18 is operatively connected to the drive arrangement 16 to control the operation thereof both on demand and on a timed schedule to cover and uncover the food container portion 12 on demand and automatically at scheduled times selected by a user. In accordance with at least one possible embodiment, the lid portion 14 can be pivoted or moved over an angular range of about 180 degrees to promote or ensure complete uncovering of the food container portion 12, wherein the open position is achieved when the lid portion has been pivoted about 180 degrees from the closed position. In accordance with at least one other possible embodiment, such as is shown in FIG. 6, the lid portion 14 can be pivoted or moved over an angular range 64 of about 90 degrees to promote or ensure complete uncovering of the food container portion 12, wherein the open position is achieved when the lid portion has been pivoted about 90 degrees from the closed position In accordance with at least one possible embodiment, the drive arrangement 16 includes a drive motor 20 and a drive shaft 22 connected thereto in vertical orientation perpendicular to the ground or a floor surface. The drive motor 20 is mounted on the food container portion 12. The lid portion 14 includes a pivot arm arrangement 24 connected to the drive shaft 22. The drive motor 20 is designed to rotate the drive shaft 22 and thereby pivot the lid portion 14 between the closed position and the open position.

In accordance with at least one possible embodiment, the food container portion 12 includes a container seal 26 positioned about an upper lip thereof. The lid portion 14 includes a lid seal 28 positioned about a lower lip thereof. The container seal 26 is designed to sealingly engage with the lid seal 28 upon the lid portion 14 being in the closed position to seal dog food 60 therein in an essentially watertight and/or airtight manner.

In accordance with at least one possible embodiment, each of the food container portion 12 and the lid portion 14 includes a rounded base portion 30 and a cylindrical body portion 32. The cylindrical body portion 32 of each of the food container portion 12 and the lid portion 14 is of essentially identical dimensions to facilitate manufacture and promote sealing engagement of the lid seal 28 and the container seal 26.

In accordance with at least one possible embodiment, the pivot arm arrangement 24 includes a first arm structure 34 attached to the cylindrical body portion 32 of the lid portion 14 adjacent the rounded base portion 30 thereof and attached in an essentially radial orientation to an end portion of the drive shaft 22. The pivot arm arrangement 24 includes a second arm structure 36 attached to the cylindrical body portion 32 of the lid portion 14 adjacent the lid seal 28 and attached in an essentially radial orientation to a middle portion of the drive shaft 22. In the embodiment shown in the figures, the first arm structure 34 and the second arm structure 36 are in the form of an essentially V-shaped bracket for increased stability.

In accordance with at least one possible embodiment, the automated dog bowl device 10 further includes support legs 54 attached to the rounded base portion 30 of the food container portion 12. A support bracket 38 is attached to the cylindrical body portion 32 of the food container portion 12 adjacent the rounded base portion 30 thereof and designed to support the drive motor 20 and the drive shaft 22. A guide arm structure 40 is attached to the cylindrical body portion 32 of the food container portion 12 adjacent the container seal 26 and includes an aperture 42 and a bushing 44 in the aperture 42 designed to support and guide the middle portion of the drive shaft 22. In the embodiment shown in the figures, the guide arm structure is in the form of an essentially V-shaped bracket like the first arm structure 34 and the second arm structure 36.

In accordance with at least one possible embodiment, the automated dog bowl device 10 further includes a first power cord 46 to connect the controller device 18 to the drive arrangement 16 and a second power cord 48 to connect the controller device 18 to a power outlet.

In accordance with at least one possible embodiment, the controller device 18 includes a user input arrangement designed to permit a user to set times at which the lid portion 14 is to be moved into the open position and a duration for how long the lid portion 14 is to be in the open position before is moved back into the closed position. The user input arrangement could be of a manual design and include manual structures like dials 50 and an on/off button 52 or similar, or it could be of a digital design, or possibly a combination of both manual and digital inputs.

Figure 8:
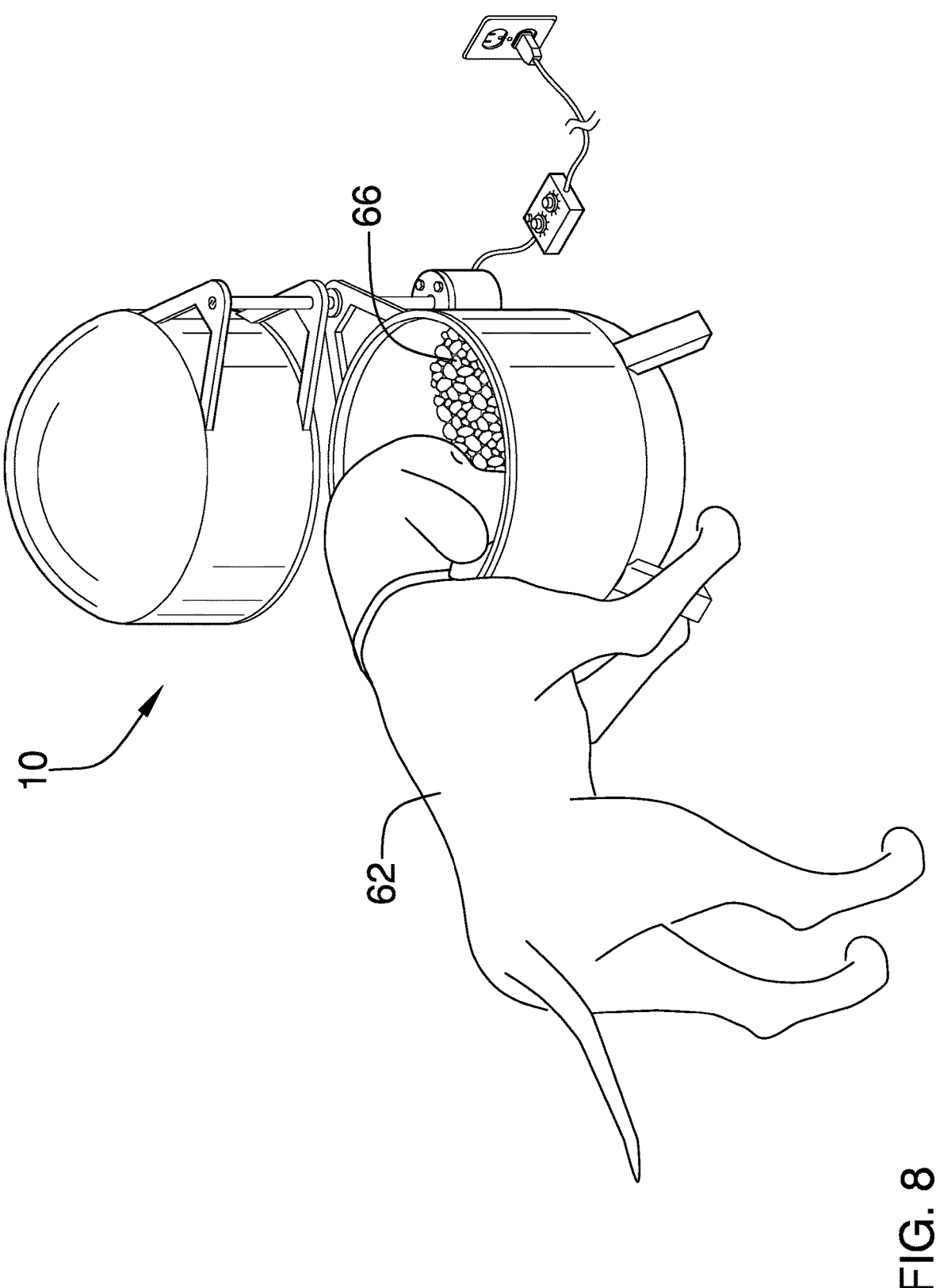
FIG. 8 is a front perspective view of an embodiment of the disclosure in use.

To use the automated dog bowl device 10, a user manually inputs a command into the controller device 18 and moves the lid portion 14 from the closed position to the open position. The user then places dog food 60 in the food container portion 12. The user manually inputs a timed schedule into the controller device 18 of what times the food container portion 12 should be uncovered and covered. The user manually inputs a command into the controller device 18 and moves the lid portion 14 from the open position to the closed position. The controller device 18 automatically sends a signal to the drive arrangement 16 to automatically move the lid portion 14 horizontally from the closed position to the open position at a time in accordance with the timed schedule to permit a pet dog to access the interior of the food container portion 12 and the dog food 60 therein, as shown in FIG. 8. The controller device 18 automatically sends a signal from the controller device 18 to the drive arrangement 16 to automatically move the lid portion 14 horizontally from the open position to the closed position at a time in accordance with the timed schedule to prevent overeating by the pet dog, unwanted access to the dog food 60 by other pets or animals, and contamination or spoiling of the dog food 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An automated dog bowl device comprising:
a food container portion configured to contain dog food and be positioned in a stationary manner on a floor or ground surface;
a lid portion configured to cover said food container portion;
a drive arrangement mounted on said food container portion and configured and disposed to operatively connect said food container portion and said lid portion;
said drive arrangement being configured to pivot said lid portion horizontally back and forth between a closed position in which said lid portion completely covers said food container portion and an open position in which said bowl portion is completely uncovered;

a controller device operatively connected to said drive arrangement to control the operation thereof both on demand and on a timed schedule to cover and uncover said food container portion on demand and automatically at scheduled times selected by a user; and
each of said food container portion and said lid portion comprises a rounded base portion and a cylindrical body portion, said cylindrical body portion of said lid portion being an annular wall and said rounded base portion of said lid portion being dome-shaped and integrally extending from said annular wall, an entirety of said cylindrical body portion and said rounded base portion of said lid portion being unitary and pivoted in a single direction simultaneously by said drive arrangement.

2. The automated dog bowl device of claim 1, wherein:
said drive arrangement comprises a drive motor and a drive shaft connected thereto in vertical orientation perpendicular to the ground or a floor surface;
said drive motor is mounted on said food container portion;
said lid portion comprises a pivot arm arrangement connected to said drive shaft; and
said drive motor is configured to rotate said drive shaft and thereby pivot said lid portion between said closed position and said open position.

3. The automated dog bowl device of claim 2, wherein:
said food container portion comprises a container seal disposed about an upper lip thereof;
said lid portion comprises a lid seal disposed about a lower lip thereof; and
said container seal is configured to sealingly engage with said lid seal upon said lid portion being in said closed position to seal dog food therein in an essentially water-tight and/or airtight manner.

4. The automated dog bowl device of claim 3, wherein said cylindrical body portion of each of said food container portion and said lid portion is of essentially identical dimensions to facilitate manufacture and promote sealing engagement of said lid seal and said container seal.

5. The automated dog bowl device of claim 4, wherein:
said pivot arm arrangement comprises a first arm structure attached to said cylindrical body portion of said lid portion adjacent said rounded base portion thereof and attached in an essentially radial orientation to an end portion of said drive shaft; and
said pivot arm arrangement comprises a second arm structure attached to said cylindrical body portion of said lid portion adjacent said lid scal and attached in an essentially radial orientation to a middle portion of said drive shaft.

6. The automated dog bowl device of claim 5, further comprising:
support legs attached to said rounded base portion of said food container portion;
a support bracket attached to said cylindrical body portion of said food container portion adjacent said rounded base portion thereof and configured to support said drive motor and said drive shaft; and
a guide arm structure attached to said cylindrical body portion of said food container portion adjacent said container seal and comprising an aperture and a bushing in said aperture configured to support and guide said middle portion of said drive shaft.

7. The automated dog bowl device of claim 6, further comprising a first power cord to connect said controller device to said drive arrangement and a second power cord to connect said controller device to a power outlet.

8. The automated dog bowl device of claim 7, said controller device comprises a user input arrangement configured to permit a user to set times at which said lid portion is to be moved into said open position and a duration for how long said lid portion is to be in said open position before being moved back into said closed position.

9. The automated dog bowl device of claim 1, wherein:

said food container portion comprises a container seal disposed about an upper lip thereof;

said lid portion comprises a lid seal disposed about a lower lip thereof; and said container seal is configured to sealingly engage with said lid seal upon said lid portion being in said closed position to seal dog food therein in an essentially water-tight and/or airtight manner.

10. The automated dog bowl device of claim 1, wherein said cylindrical body portion of each of said food container portion and said lid portion is of essentially identical dimensions.

11. The automated dog bowl device of claim 1, wherein:

said pivot arm arrangement comprises a first arm structure attached to said lid portion and an end portion of said drive shaft; and said pivot arm arrangement comprises a second arm structure attached to lid portion and a middle portion of said drive shaft.

12. The automated dog bowl device of claim 1, further comprising:

support legs attached to said rounded base portion of said food container portion;

a support bracket attached to said food container portion and configured to support said drive arrangement; and a guide arm structure attached to said food container portion and comprising an aperture and a bushing in said aperture configured to support and guide a middle portion of said drive shaft.

13. The automated dog bowl device of claim 1, further comprising a first power cord to connect said controller device to said drive arrangement and a second power cord to connect said controller device to a power outlet.

14. The automated dog bowl device of claim 1, wherein said controller device comprises a user input arrangement configured to permit a user to set times at which said lid portion is to be moved into said open position and a duration for how long said lid portion is to be in said open position before being moved back into said closed position.

15. A method of using the automated dog bowl device of claim 1 comprising the steps of:

manually inputting a command into said controller device and moving said lid portion from said closed position to said open position;

placing dog food in said food container portion;

manually inputting a timed schedule into said controller device of what times said food container portion should be uncovered and covered;

manually inputting a command into said controller device and moving said lid portion from said open position to said closed position;

automatically sending a signal from said controller device to said drive arrangement to automatically move said lid portion horizontally from said closed position to said open position at a time in accordance with said timed schedule to permit a pet dog to access the interior of said food container portion and said dog food therein; and automatically sending a signal from said controller device to said drive arrangement to automatically move said lid portion horizontally from said open position to said closed position at a time in accordance with said timed schedule to prevent overeating by said pet dog, unwanted access to said dog food by other pets or animals, and contamination or spoiling of said dog food.

\* \* \* \* \*